United States Patent
Wagers et al.

[11] Patent Number: 5,525,414
[45] Date of Patent: Jun. 11, 1996

[54] METHOD AND MATERIALS FOR COATING SYNTHETIC TEXTILE COMPOSITIONS

[75] Inventors: James A. Wagers, Leesville, S.C.; Verne J. Martin, Cedar Rapids, Iowa

[73] Assignee: Penford Products Co., Cedar Rapids, Iowa

[21] Appl. No.: 190,947

[22] Filed: Feb. 3, 1994

[51] Int. Cl.⁶ .................................................. B32B 7/00
[52] U.S. Cl. ............... 428/265; 427/389.8; 427/389.9; 428/268; 428/378; 527/300; 527/303; 527/313; 527/314; 527/315
[58] Field of Search ................. 427/382.8, 359.9, 427/393.5; 428/265, 268, 290, 375, 378; 527/300, 303, 313, 314, 315

[56] References Cited

U.S. PATENT DOCUMENTS

| | | | |
|---|---|---|---|
| 4,248,755 | 2/1981 | Williams | 260/29.6 TA |
| 4,301,017 | 11/1981 | Kightlinger et al. | 252/8.6 |
| 4,375,535 | 3/1983 | Kightlinger et al. | 527/313 |
| 4,421,566 | 12/1983 | Hasuly et al. | 106/213 |
| 4,530,876 | 7/1985 | Brodmann et al. | 428/283 |
| 4,786,530 | 11/1988 | Fox | 427/384 |
| 4,808,479 | 2/1989 | Fox | 428/394 |
| 5,003,022 | 3/1991 | Nguyen et al. | 527/300 |

FOREIGN PATENT DOCUMENTS

WO92/13714  8/1992  WIPO.

OTHER PUBLICATIONS

*Chemistry and Industry of Starch*, Kerr, Ralph W., Editor, Academic Press Inc. Publishers, New York, New York, 1950, pp. 570–575.

*Primary Examiner*—Michael Lusignan
*Attorney, Agent, or Firm*—Marshall, O'Toole, Gerstein, Murray & Borun

[57] ABSTRACT

The present invention provides a method of preparing a sized synthetic fiber comprising the steps of (a) preparing a sizing composition for synthetic materials used in textile manufacturing comprising (i) a lubricant or wetting agent and (ii) a binder composition comprising starch and a reaction product of styrene and 1,3-butadiene wherein said starch is characterized by an intrinsic viscosity of from about 0.07 dl/g to about 0.35 dl/g; (b) sizing synthetic fiber with the sizing composition of step (a); and (c) removing excess sizing composition from the sized fiber.

20 Claims, No Drawings

METHOD AND MATERIALS FOR COATING SYNTHETIC TEXTILE COMPOSITIONS

BACKGROUND OF THE INVENTION

The present invention relates to sizing of synthetic materials utilized in textile manufacturing. Specifically, the invention relates to an improved synthetic filament size composition comprising (i) a lubricant or wetting agent and (ii) a reaction product of styrene, 1,3-butadiene and starch wherein said starch is characterized by an intrinsic viscosity from about 0.07 dl/g to about 0.35 dl/g.

In the course of manufacturing textiles, fiber materials are woven together to form a cloth. In the weaving operation, feed yarn, referred to as warp yarn, is fed by a loom. A weaving yarn, referred to as a filling yarn, is woven in between the individual warp yarns to form a fabric. During this operation, there is considerable abrasion between the warp yarn and filling yarn such as during the busting and weaving steps which sometimes results in breakage and an inefficient weaving operation. As used herein fiber refers to both to single filaments as well as to yarns comprising spun fibers.

Prior to weaving, fibers are normally sized by passing through a bath of water and natural and/or synthetic chemicals which adhere to fibers and by encapsulation (migration of size on the fibers) and/or penetration (migration through the fibers) protect the fibers from both yarn-to-yarn and machine abrasion. Of interest to the present invention is the disclosure of co-owned and copending U.S. patent application Ser. No. 08/022,726 filed Feb. 24, 1993 now abandoned which relates to warp yarn sizing for natural and synthetic fiber compositions comprising (i) a basic size, (ii) a binder wherein said binder comprises starch and a reaction product of styrene and 1,3-butadiene and wherein said starch is characterized by an intrinsic viscosity of about 0.07 dl/g to about 0.35 dl/g, and (iii) a textile wax. Typical size formulations for synthetic fibers, fiberglass, spun synthetic yarns and synthetic filaments comprise water; a basic size material which is typically a synthetic polymer such as polyvinyl alcohol, polyvinyl acetate, polyacrylates, acrylics, polyester resins, and the like. Other additives useful in conventional yarn sizes include lubricants such as lauryl alcohol or finishing oil, humectents, salts, defoamers, surfactants, wetting agents, penetrating agents and the like. Typical sizing compositions for synthetic fibers comprises polyvinyl alcohol at a concentration of from about 5 to about 7% solids by weight and from about 10% to about 25% polyethylene glycol (by weight based upon polyvinyl alcohol weight). One specific sizing composition for synthetic fibers comprises 55 pounds polyvinyl alcohol. 14 pounds polyethylene glycol and 100 gallons water.

Prior to dyeing, the size must be removed from the fabric. Size materials can also build up on the cook kettle, size boxes, and the like. Accordingly, ease of removal of the size from both the fabric and the machinery is an important property for sizes. Current polyvinyl alcohol sizes for synthetic filaments are characterized by cleanup problems because of the tendency of polyvinyl alcohol subunits to bond to themselves and thus become insoluble. Acrylate sizes are not as poor with respect to cleanup as polyvinyl alcohol sizes but are expensive. Natural materials such as guar gums also suffer from being expensive.

Accordingly, there exists a need in the art for a relatively inexpensive sizing composition for synthetic fibers that has good encapsulation, penetration, clean-up properties and provides good protection for the fiber.

SUMMARY OF THE INVENTION

The present invention relates to improved sizing compositions and methods for sizing synthetic fibers. Specifically, the invention provides improved fiber sizing compositions for sizing of synthetic fibers comprising (i) a lubricant or wetting agent and (ii) a binder composition comprising starch and a reaction product of styrene and 1,3-butadiene wherein said starch is characterized by an intrinsic viscosity of from about 0.07 dl/g to about 0.35 dl/g when measured under standard conditions in water at 25° C. (room temperature). The sizing compositions primarily comprise the binder comprising starch and reaction product of styrene and 1,3-butadiene but comprise small amounts of either lubricant or wetting agent to provide suitable properties for sizing. Typically, the sizing compositions comprise from about 0.5% to about 5% lubricant or wetting agent by weight with from about 1% to about 2% by weight being preferred.

The compositions of the invention have surprising utility in sizing synthetic fibers given that sizing materials which are relatively high in starch content would not be expected to bind to synthetic fibers which are hydrophobic. Moreover, sizing compositions which similarly comprise relatively high concentrations of styrene and 1,3-butadiene copolymers would not be expected to readily desize from fibers once applied.

The invention further provides methods of preparing a sized synthetic fiber comprising the steps of: (a) preparing a sizing composition for synthetic materials used in textile manufacturing comprising (i) a lubricant or wetting agent, and (ii) a binder composition comprising starch and a reaction product of styrene and 1,3-butadiene wherein said starch is characterized by an intrinsic viscosity of from about 0.07 dl/g to about 0.35 dl/g; (b) sizing fiber with the sizing composition of step (a); and (c) removing excess sizing composition from the sized fiber. The invention further provides a sized synthetic fiber prepared using the sizing compositions of the invention as well as a sized cloth using the sizing composition of the invention.

DESCRIPTION OF THE INVENTION

The present invention relates to improved sizing compositions and methods for synthetic fibers including spun synthetics, fiberglass and synthetic filaments. The size materials of the invention are characterized by ease of application and improved cleanup. These sizing compositions also provide improvements in fiber coating ("enrobing") which result in improved fiber protection and which improve yield during weaving.

The improved sizing compositions of the invention comprise (i) a lubricant or wetting agent, (ii) a binder comprising starch and a reaction product of styrene and 1,3-butadiene. The binders comprise starch and a reaction product of styrene and 1,3-butadiene wherein the starch is thinned and is characterized by an intrinsic viscosity of from about 0.07 dl/g to about 0.35 dl/g when measured in aqueous conditions at standard conditions (i.e., room temperature). The binders of the invention can also comprise blends of starches characterized by an intrinsic viscosity of from about 0.07 dl/g and 0.35 dl/g and styrene/1,3-butadiene lattices or can comprise reaction products of the thinned starches with styrene and 1,3-butadiene such as starch graft copolymers.

Starches suitable for use according to the invention include practically all starches of plant origin including starches from corn, including waxy corn, wheat, potatoes, tapioca, rice, sago and sorghum with corn starch being preferred. Derivatized starches are also suitable for practice of the invention. Suitable starch derivatives include, but are not limited to, starch esters, cross linked starches and oxidized starches. Preferred starches are characterized by an intrinsic viscosity of from about 0.12 dl/g to about 0.25 dl/g and include a thinned, lightly oxidized hydroxyethyl starch characterized by an intrinsic viscosity of about 0.23 dl/g available commercially as Pencote® (Penford Products Company, Cedar Rapids, Iowa). The starch should generally be sufficiently thinned by conventional techniques such as enzyme or acid thinning such that it is characterized by intrinsic viscosity of less than about 0.35 dl/g because thicker starches are too viscous and are incapable of forming the size compositions of the invention. For example, the intrinsic viscosity of Pearl Starch (an unmodified, unthinned corn starch) is in the range of from about 0.80 to about 1.10 dl/g. At the same time, the starch should generally not be thinned to less than an intrinsic viscosity of about 0.07 dl/g as such starches tend to lose their film strength and may tend to lose their adhesive properties.

Suitable lattices for use in starch, styrene/butadiene latex blends include commercially available styrene/butadiene rubber (SBR) blends. One preferred styrene/butadiene latex is Dow 620 latex (Dow Chemical Co., Midland, Mich.) but numerous other lattices are useful according to the invention. In addition, styrene/butadiene lattices comprising additional copolymers as is well known in the art are also contemplated to be useful according to the invention.

The binder can comprise a blend of starch and styrene/1,3-butadiene latex such as can be obtained commercially but is preferably a starch graft copolymer with styrene and 1,3-butadiene. Most preferred is a commercially available starch graft styrene/1,3-butadiene copolymer produced from the reaction products of styrene and 1,3-butadiene and a thinned lightly oxidized hydroxyethyl starch having a solids concentration of 21% by weight and characterized by an intrinsic viscosity of about 0.23 dl/g available commercially as Pencote® (Penford Products Company, Cedar Rapids, Iowa). The starch graft copolymer is characterized by a monomer to starch ratio of 42 parts monomer to 58 parts starch by weight with the monomer having a butadiene to styrene ratio of 42 parts butadiene to 58 parts styrene by weight and which is available as Penflex™ (Penford Products Company, Cedar Rapids, Iowa).

Starch graft copolymers of styrene and 1,3-butadiene can be produced according to methods such as those disclosed in Nguyen et al., U.S. Pat. No. 5,003,022 which discloses methods of producing butadiene containing starch graft copolymers. Suitable monomer to starch ratios for the binders range from about 30 parts monomer to 70 parts starch (by weight) to about 60 parts monomer to about 40 parts starch (by weight). Binder materials comprising higher ratios of monomer not only tend to be less cost effective, but may also be resistant to desizing due to coalescence of the nonomer portion of the binder. Suitable monomer ratios in a styrene/butadiene copolymer range from about 30 parts butadiene to about 70 parts styrene (by weight) to about 70 parts butadiene to 30 parts styrene by weight. In the practice of the present invention, preferred copolymers may generally comprise higher ratios of butadiene to styrene because of the lesser cost of butadiene. One preferred binder material according to U.S. Pat. No. 5,003,022 is a styrene/1,3-butadiene starch graft copolymer produced from a highly thinned oxidized hydroxyethyl starch characterized by an intrinsic viscosity of about 0.077 dl/g which binder is available commercially as Pensize® (Penford Products Company, Cedar Rapids, Iowa).

In addition to including a binder comprising starch and a reaction product styrene and 1,3-butadiene, the sizing materials of the invention further comprise water, a lubricant or wetting agent, and other optional ingredients compatible with the binder. Lubricants are used as part of the sizing material to help reduce the abrasion between the synthetic fibers during weaving. Lubricants useful with the invention include ethylated lauryl alcohol with one preferred lubricant being Macol® LA 23 (PPG Industries, Inc., Gurnee, Ill.). Wetting agents are useful as a component of the size composition by reducing the surface tension of the size solution and promote more even distribution of the size materials on the fibers. Wetting agents suitable for use according to the invention include nonionic surfactants, with branched or linear alcohol ethoxylates being preferred. A particularly preferred wetting agent is Ethal DA-5 (an alcohol ethoxylate available from Ethox Chemicals, Inc. Greenville, S.C.). While it has been found that only one of either a lubricant or wetting agent is necessary to provide for suitable sizing properties to the synthetic size compositions of the invention it is contemplated that both may be used together. Other ingredients that may be incorporated into the sizing compositions of the invention include surfactants, defoamers, salts, thickeners, microbiocides and the like. The exact selections of identities and amounts of materials vary according to the yarns to be sized and the fabric to be produced but is within the ordinary skill of those in the art.

The sizes produced according to the invention are useful with any sort of synthetic fibers. Such fibers include both filaments and yarns and can be produced from a variety of materials including polyesters, nylons, rayons, fiberglass and the like.

The following examples are provided in order to clearly illustrate the practice of the invention but are not to be considered to limit the scope of the invention. In the examples, the sizing and weaving operations were carried out under standard current commercial conditions for that style of fabric at that mill location. In the examples, removal of the new size from both equipment and cloth was judged to be easier than removal of standard sizing formulations such as those which typically comprise polyvinyl alcohol at 5–7% solids concentrations.

EXAMPLE 1

In this example, the 7.5% solids sizing formulation detailed below was applied to fiberglass at an add-on rate of 1.5–2%. The basic size was 3.5 wt parts of ethylated lauryl alcohol lubricant (Macol® LA) and 100 volume parts of Penflex™ binder. The formulation was:

| | |
|---|---|
| Penflex ™ binder at 30% solids | 60 gallons |
| Lubricant (Macol ® LA 23) | 2.4 pounds |
| Fragrance (Vanilla extract) | 8 fluid ounces |
| Water | 198 gallons |

EXAMPLE 2

In this example, the formulation was applied to acetate fiber at 10% solids and consisted of:

| | |
|---|---|
| Lubricant (Macol® LA 23) | 3.5 lbs |
| Penflex™ binder at 30% solids | 100 gallons |
| Water | 221 gallons |

EXAMPLE 3

In this example, the 15.0% formulation was applied to polyester filament. The basic size was 3.5 wt parts of ethylated alcohol lubricant (Macol® LA) and 100 volume parts of Penflex™ binder at 30% solids. This basic size was then diluted with water to obtain the 15.0% solids formulation.

| | |
|---|---|
| Penflex™ binder at 30% solids | 100 gallons |
| Lubricant (Macol LA23) | 3.5 pounds |
| Water | 130 gallons |

In this particular example, the equipment used for sizing was a specially designed Sucker-Miller slasher. The filament being sized was a 150 denier texturized polyester filament. The warp contained 4200 ends. Five lease rods were used thus forming six sheds of yarn. Squeeze pressure was 3 kilonewtons on creep and 7 kilonewtons at full speed. The slasher ran very well with no complications. Shedding was apparent but did not affect quality or runnability.

The sized polyester filament was then sent to the loom to be woven. All data from weaving showed the sized filament to perform satisfactorily on the loom. In the course of 168,192 picks 4 stops occurred, or 2.38 stops per 100,000 picks. This was an acceptable number of stops when compared to industry standards.

As can be seen above, the sizing compositions of the invention can comprise different size materials and other ingredients, and can be applied to a wide variety of synthetic fibers at varying solids concentrations and add-on amounts. It is anticipated that numerous variations and modifications of the embodiments described above will occur to those of ordinary skill in the art when apprised of the teachings of the present specification. Accordingly, only such limitations as appear in the appended claims should be placed thereon.

What is claimed is:

1. A method of preparing a sized synthetic fiber, said method comprising the steps of:
   (a) preparing a sizing composition for synthetic materials used in textile manufacturing comprising (i) 0.5% to 5% by weight on a solids basis of a lubricant or wetting agent and (ii) a binder composition comprising starch and a reaction product of styrene and 1,3-butadiene wherein said starch is characterized by an intrinsic viscosity of from about 0.07 dl/g to about 0.35 dl/g, said monomer to starch ratio is from 30/70 to 60/40, and said butadiene to styrene ratio is from 30/70 to 70/30;
   (b) sizing fiber with the sizing composition of step (a); and
   (c) removing excess sizing composition from the sized fiber.

2. The method of claim 1 wherein said starch is characterized by an intrinsic viscosity of about 0.12 dl/g to about 0.25 dl/g.

3. The method of claim 1 wherein said binder comprises a starch styrene/1,3-butadiene graft copolymer.

4. The method of claim 1 wherein said binder comprises a blend of starch and a styrene/1,3-butadiene latex.

5. The method of claim 1 wherein the synthetic fiber is a filament.

6. The method of claim 1 wherein the synthetic fiber is a yarn.

7. A sized synthetic fiber prepared according to the method of claim 1.

8. The sized synthetic fiber of claim 7 which is a filament.

9. The sized synthetic fiber of claim 7 which is a yarn.

10. The sized synthetic fiber according to claim 7 wherein said sizing binder comprises a starch styrene/1,3-butadiene graft copolymer.

11. The sized synthetic fiber of claim 7 wherein said wetting agent is an alcohol ethoxylate.

12. The sized synthetic fiber of claim 7 wherein said lubricant is an ethylated lauryl alcohol.

13. A sized synthetic cloth comprising sized fibers prepared according to the method of claim 1.

14. The sized cloth of claim 13 wherein the warp yarn sizing binder comprises a starch styrene/1,3-butadiene graft copolymer.

15. A sizing composition for synthetic fibers used in textile manufacturing comprising (i) 0.5% to 5% by weight on a solids basis of a lubricant or wetting agent selected from the group consisting of ethylated lauryl alcohol and an alcohol ethoxylate and (ii) a binder composition comprising starch and a reaction product of styrene and 1,3-butadiene wherein said starch is characterized by an intrinsic viscosity of from about 0.7 dl/g to about 0.35 dl/g, said monomer to starch ratio is from 30/70 to 60/40, and said butadiene to styrene ratio is from 30/70 to 70/30.

16. The sizing composition of claim 15 wherein said starch is characterized by an intrinsic viscosity of about 0.12 dl/g to about 0.25 dl/g.

17. The sizing composition of claim 15 wherein said binder comprises a starch styrene/1,3-butadiene graft copolymer.

18. The sizing composition of claim 15 wherein said binder comprises a blend of starch and a styrene/1,3-butadiene latex.

19. The sizing composition of claim 15 wherein said lubricant is ethylated lauryl alcohol.

20. The sizing composition of claim 15 wherein said wetting agent is alcohol ethoxylate.

* * * * *